May 20, 1958  J. PARNELL  2,835,442
ELECTRICAL APPARATUS
Filed Feb. 14, 1955  4 Sheets-Sheet 1

INVENTOR.
JOHN PARNELL
BY
ATTORNEY.

May 20, 1958   J. PARNELL   2,835,442
ELECTRICAL APPARATUS
Filed Feb. 14, 1955   4 Sheets-Sheet 2

INVENTOR.
JOHN PARNELL

BY
ATTORNEY.

*INVENTOR.*
JOHN PARNELL
BY Arthur H. Swanson
ATTORNEY.

May 20, 1958 J. PARNELL 2,835,442
ELECTRICAL APPARATUS
Filed Feb. 14, 1955 4 Sheets-Sheet 4

INVENTOR.
JOHN PARNELL
BY Arthur H. Swanson
ATTORNEY.

United States Patent Office 2,835,442
Patented May 20, 1958

2,835,442
ELECTRICAL APPARATUS

John Parnell, Ambler, Pa., assignor to Minneapolis-Honeywell Regulator Company, Minneapolis, Minn., a corporation of Delaware Application February 14, 1955, Serial No. 487,799

23 Claims. (Cl. 235—61)

A general object of the present invention is to provide a new and improved apparatus useful in ratio measurement and control. More specifically, the present invention is concerned with an improved electrical ratio relay type of apparatus which is characterized by its accuracy and its general adaptability to ratio measuring problems.

Ratio relays are particularly adapted for use where it is desired to produce an output signal which is a function of the ratio of at least two applied input signals. The input signals may be derived from suitable variable sensing means which produce electrical signals proportional to the magnitudes of preselected variables. The output signal which will be proportional to the ratio of the input signals may well be used for indicating or control purposes. The ratio relays as used in the present invention involve a product taking operation between two of the electrical signals involved. It is accordingly necessary to provide a means for multiplying the applied electrical signals. A tool useful in a mechanism of the present type is a force balance type of apparatus where applied electrical signals create forces upon a balanceable member which forces are balanced by a further electrical signal which is of a magnitude proportional to the unbalance forces acting upon the balanceable member.

It is accordingly a more specific object of the present invention to provide a new and improved electrical signal multiplying device.

Another more specific object of the present invention is to provide an improved electrical signal multiplying apparatus comprising a force balance mechanism with the unbalance forces being produced by a pair of coil means, one of which produces an unbalance force which is the square of the difference of two applied electrical signals and the other of which produces an unbalance force which is the square of the sum of two applied electrical signals.

Still another object of the present invention is to provide, in cooperation with the foregoing object, a means which will produce a force which varies linearly with the applied electrical signals.

A useful and flexible type of ratio relay requires the addition of span and suppression adjustments. With apparatus of the type set forth in the present invention, force producing springs and adjustable shunts for the electrical input circuits may be readily applied for accomplishing the span and suppression adjustments. The provision of such springs and shunts in the present type of apparatus makes it possible to produce an apparatus which will operate on the ideal equation for a ratio relay where each of the terms has a constant associated therewith. A representative equation for a ratio relay may be as follows:

$$A + I_2 = (B + CI_1)(D + I_3)$$

where $I_1$, $I_2$, and $I_3$ are the electrical signals and A, B, C, and D are constants. Preferably, although not necessarily, each of the constants in the above equation should be adjustable independently of the other constants.

It is therefore a further object of the present invention to provide an improved electrical ratio apparatus having a balance equation of:

$$A + I_2 = (B + CI_1)(D + I_3)$$

where $I_1$, $I_2$, and $I_3$ are applied electrical signals and A, B, C and D are constants.

A still further object of the present invention is to provide, in accordance with the foregoing object, a ratio relay apparatus where the constants may each be adjusted independently of each other.

The various features of novelty which characterize the invention are pointed out with particularity in the claims annexed hereto and forming a part of this specification. For a better understanding of the invention, its advantages, and specific objects attained with its use, reference should be had to the accompanying drawings and descriptive matter in which there is illustrated and described preferred embodiments of the invention.

Figure 1:
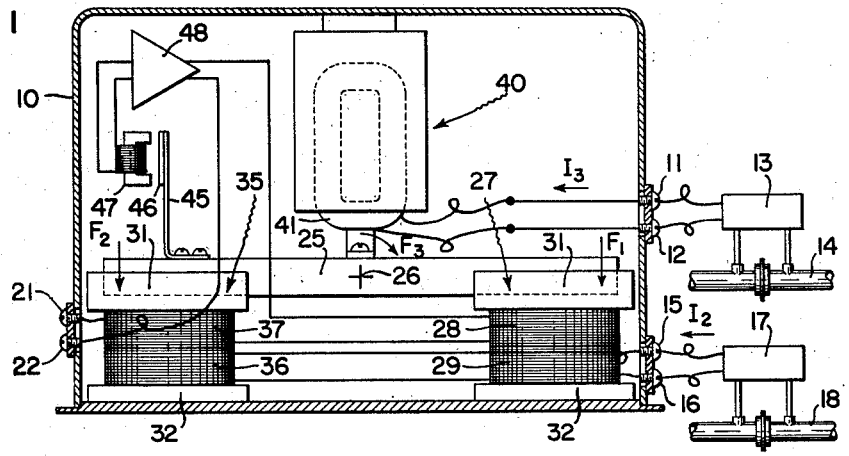
Fig. 1 is a diagrammatic showing of a preferred form of ratio relay mechanism.

Referring first to Fig. 1, the numeral 10 represents the ratio relay apparatus of the present invention. As shown, this ratio relay apparatus has a pair of electrical input terminals 11 and 12 which derive an electrical signal from a suitable variable sensing means such as a differential pressure transmitter 13, the latter of which is producing an output electrical current proportional to the rate of flow of fluid through a conduit 14. The ratio relay 10 also has a further pair of input terminals 15 and 16 which receive an energizing electrical signal from a further differential pressure transmitter 17, the latter of which is producing an electrical signal in its output proportional to the rate of flow of a fluid in a conduit 18. The ratio relay 10 further has a pair of output terminals 21 and 22 which output terminals have an electrical signal which may be used to effect a desirable ratio control of the ratio of the fluids flowing in conduits 14 and 18, by control means not shown.

Figure 2:
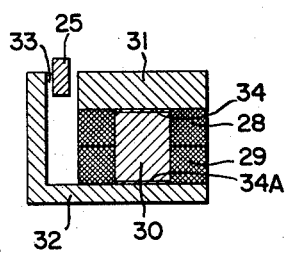
Fig. 2 shows a cross sectional detail of an electromagnetic section of Fig. 1.

The ratio relay mechanism 10 itself comprises a force balance member 25 which is pivoted at 26. This force balance member 25 may take the form of an iron vane which has its right end positioned in the air gap of an electromagnetic coil assembly 27. This coil assembly, shown in cross sectional detail in Fig. 2, comprises a pair of coils 28 and 29 which are wound upon a cylindrical core member 30. Attached to the top of the core member 30 is an iron core member 31 in rectangular shape with one side of the member cooperating with a further member 32 in the form of an L shape to form an air gap at 33 where the iron vane 25 is positioned and adapted for movement at right angles across the air gap. The L shaped member 32 has an extension fastened to the lower end of the core 30 to complete a magnetic circuit which is closed except at the air gap 33. The core 30 may be separated from the members 31 and 32 by suitable shims 34 and 34A which are provided to minimize localized saturation effects.

Acting upon the left end of the beam 25 is a further electromagnetic force producing member 35. This member comprises the same basic elements of the electromagnetic force producing means 27 with the cross sectional detail shown in Fig. 2 being applicable to the unit 35 as well as the unit 27. In this electromagnetic force producing unit there are a pair of coils 36 and 37.

Also attached to the beam or force balance member 25 is a further electromagnetic force producing member 40. This member 40 comprises a coil 41 wound as a flat coil and movable angularly about the pivot 26 in a plane which corresponds to the principal plane of the coil. This force producing unit may well take the form of the force producing unit disclosed and claimed in the copending application of Philip E. Shafer, Serial No. 433,505 and filed June 1, 1954.

Attached to the force balance member 25 is a motion detecting arm 45 carrying an iron member 46, the latter of which is used to vary the air gap of a coil member 47. The coil member 47 forms a part of an electrical oscillator and amplifier section 48, the latter of which will produce an output current proportional to the motion of the member 46 relative to the coil assembly 47. This motion sensing means may well take the form of the motion sensing apparatus disclosed and claimed in the copending application of William J. Popowsky, Serial No. 442,264, and filed July 9, 1954.

In considering the operation of the apparatus shown in Fig. 1, consideration is first given to the functioning of each of the individual electromagnetic units incorporated in the ratio relay mechanism. The unit 27 produces a force upon the beam 25 in accordance with the electrical signals flowing in the coils 28 and 29. In the present discussion, it is assumed that the coils 28 and 29 are connected so that the currents flowing through the respective coils are in opposition. The resultant force acting upon the iron vane or force balance member 25, which is positioned in the air gap 33, will be a force which is proportional to the square of the differences of the currents flowing in the respective coils 28 and 29. This assumes that there are the same number of turns in each of the coils 28 and 29. Thus, the force equation for a unit of the type shown at 27 may be set forth as follows:

$$F_1 = K(I_1 - I_2)^2$$

The electromagnetic force producing unit 35 is further presumed to correspond in structural detail to the unit 27 both as to the general shape and to the manner in which the coils are constructed. However, in the electromagnetic force producing unit 35, the coils are so connected that the electrical currents are additive and the resultant force produced upon the left end of the force balance member 25 will be proportional to the square of the sum of the applied currents to the respective coils 36 and 37. The force equation for the unit 35 may be expressed as follows:

$$F_2 = K(I_1 + I_2)^2$$

Since the force producing units are acting upon the force balance member 25 on opposite ends of the pivot 26, and in the same direction, it is possible to determine the resultant force upon the member 25 by subtracting the forces produced by the units 27 and 35. The resultant force upon the balance member 25 will be proportional to the product of the current signals applied to the coils of the units 27 and 35. In other words, this may be expressed mathematically as follows:

$$F_2 - F_1 = 4KI_1I_2$$

It will be noted from the foregoing that the coils 28 and 37 are connected in series and the coils 29 and 36 are connected in series so that their signals combine as indicated.

The further force producing unit 40 will produce a force upon the member 25 which varies as a first power of the electrical signal applied thereto. This may be expressed mathematically as follows:

$$F_3 = K'I_3$$

When the mechanism is in a state of balance, the force from the unit 40 will balance the resultant forces originating from the electromagnetic devices 27 and 35. This relationship may be best seen mathematically by considering the following equations.

$$F_3 = F_2 - F_1$$

where the effective lever arms are equal or $$K'I_3 = 4KI_1I_2$$

In the particular embodiment shown in Fig. 1, the motion of the member 25 is detected by the elements 45—48 and an output current is supplied to the coils 28 and 37 as well as to the indicating instrument 22. It will be seen from this that the current flowing in the output terminals 21 and 22 is the current which will do the force balancing of the input forces acting upon the member 25 originating from the units 27 and 40. The above balance equation for the currents flowing in the apparatus may be rewritten as follows:

$$I_1 = \frac{K'I_3}{4KI_2}$$

or $$I_1 = \frac{K''I_3}{I_2}$$

This equation shows the manner in which the apparatus functions as a ratio relay to determine the ratio between the electrical signals applied to the input terminals 11—12 and 15—16.

Figure 8:
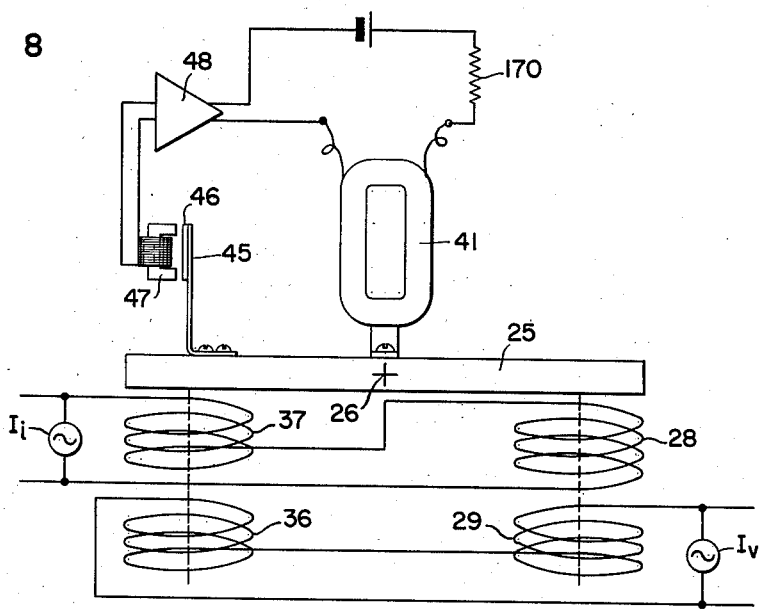
Fig. 8 shows the apparatus of Fig. 1 connected as a power measuring transducer.
Figure 9:
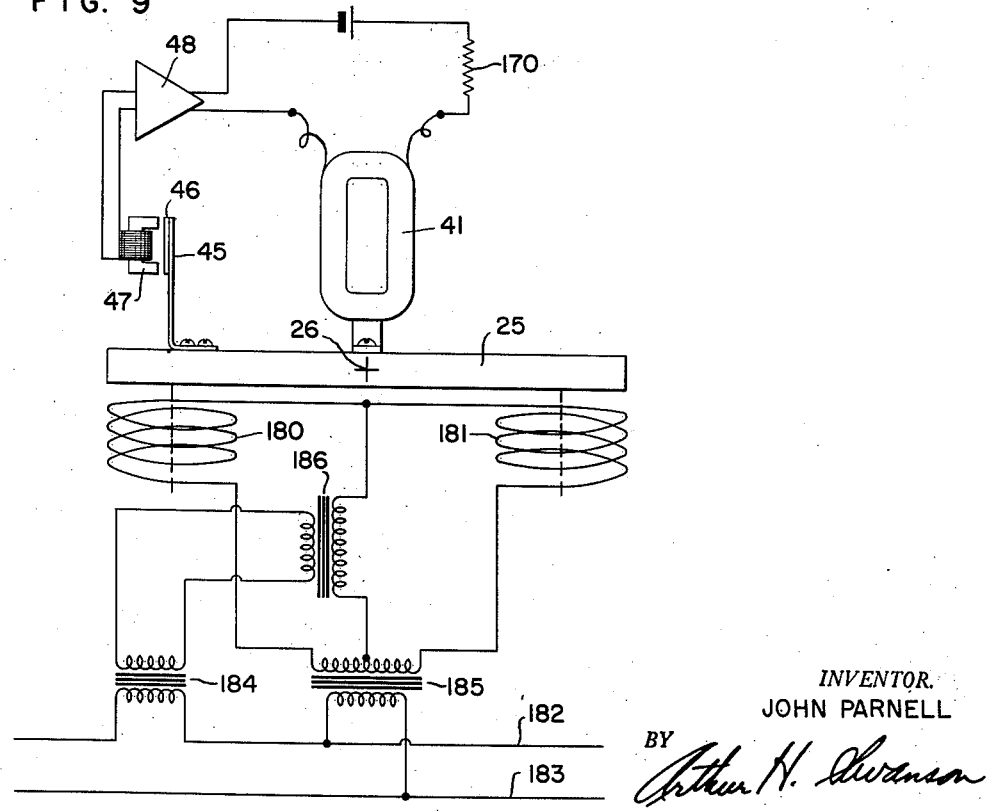
Fig. 9 shows a modified form of the apparatus shown in Fig. 8.

By connecting the output of the detector unit 48 to the coil 41 and connecting the leads supplied to the coil 41 to the terminals 21—22, it is possible to have the apparatus shown in Fig. 1 function as a multiplying device as will be readily apparent from the foregoing equations. One application of this connection is in the measure of electrical power. Representative power measuring devices are shown in Figs. 8 and 9.

FIGURE 3

Figure 3:
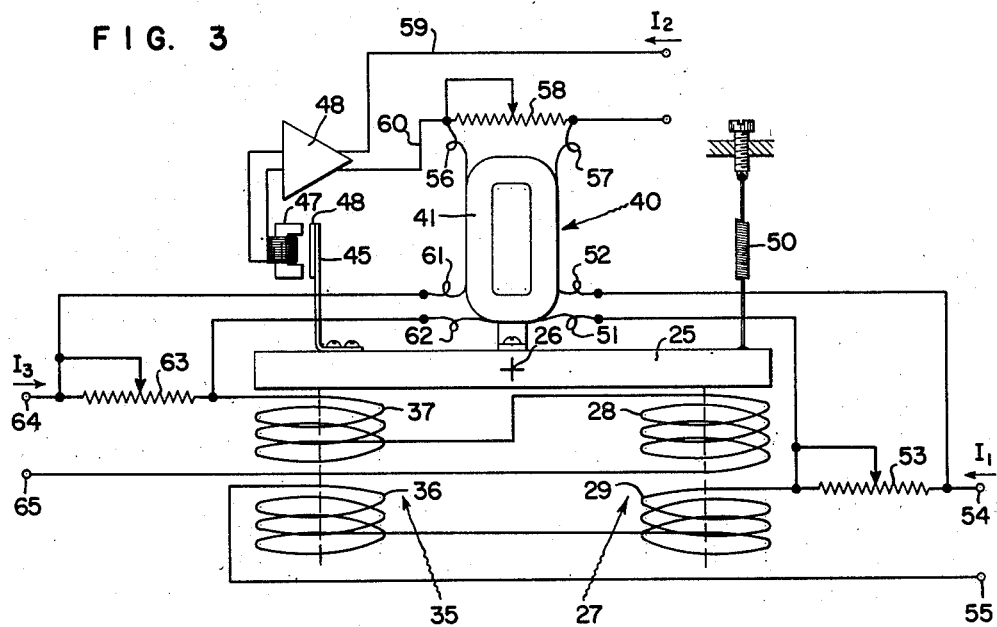
Fig. 3 shows a modified form of ratio relay apparatus.

The apparatus disclosed in Fig. 3 is structurally substantially the same as the apparatus disclosed in Fig. 1. Components of the apparatus shown in Fig. 3 corresponding to those of Fig. 1 carry corresponding reference characters.

Added to the apparatus of Fig. 3 is a spring 50 which is attached to one end of the member 25. Another modification of the apparatus of Fig. 3 is that the coil structure associated with the electromagnetic unit 40 is wound in three separate sections which are electrically isolated but cooperate magnetically to produce a resultant force upon the member 25. The first input to the coil of the unit 40 is at terminals 51—52 and these terminals are shunted by an adjustable rheostat 53 which is in series with input circuit including terminals 54 and 55, the latter of which have a signal applied thereto identified by the symbol $I_1$. A further pair of input terminals for the coil means of the force unit 40 are identified by the numerals 56—57. These terminals are likewise shunted by a rheostat 58, the latter of which is in series with the output leads 59 and 60, through which the output current $I_2$ will be flowing. The numerals 61—62 define the third input to the coil means of the force unit 40. These terminals 61—62 are shunted by a rheostat 63 which is connected in series with the input circuit including terminals 64—65 which have applied thereto a signal identified by the numeral $I_3$.

In considering the operation of Fig. 3, it is assumed that the coil structure for the force producing units 27 and 35 are the same as those of Fig. 1. Thus, these two force producing units will produce a net force upon the force balance member 25 which is proportional to the product of the input signals $I_1$ and $I_3$. Unit 40 will produce a force upon the member 25 which force varies as the first power of the net ampere turns of the coil means 41.

The basic functioning of the apparatus of Fig. 3 corresponds to that of Fig. 1 in that any unbalance forces will be detected by the motion sensing mechanism 45—48 and there will be produced an output electrical signal in the leads 59—60 which will be applied to one section of the coil means 41 to force balance the member 25. Thus, a predetermined relationship may be established between the output current $I_2$ and the input currents $I_1$ and $I_3$.

In analyzing the apparatus of Fig. 3 more completely, it is desired that this apparatus be arranged to have a balance equation as follows:

(1)  $\qquad A + I_2 = (B + CI_1)(D + I_3)$

The relationship between this desired torque balance equation and the actual balance equation is demonstrated in the following analysis:

(2)  $\qquad K_s + K_2 I_2 = I_1 I_3 + K_3 I_3 + K_1 I_1$ when $K_s$ = torque spring constant of spring 50.

$$K_1 = \frac{R_{53}}{R_{51-52} + R_{53}}$$

$$K_2 = \frac{R_{58}}{R_{56-57} + R_{58}}$$

$$K_3 = \frac{R_{63}}{R_{61-62} + R_{63}}$$

where it is assumed the force per unit current value of the linear coils and the force per unit current squared value of the multiplying unit are all equal to one. Further, it is assumed the effective lever arms are equal. The values of A, B, C and D may be determined by first multiplying Equation 1 out and rearranging the terms as follows:

(3)  $\qquad A - BD + I_2 = CI_1 I_3 + BI_3 + CDI_1$

Comparing (3) with (2), leads to the following:

$$A - BD = \frac{K_s}{K_2}, \quad C = \frac{1}{K_2}$$

$$B = \frac{K_3}{K_2} \text{ and } CD = \frac{K_1}{K_2}$$

Thus, (4)  $\qquad A = \frac{K_s}{K_2} + \frac{K_1 K_3}{K_2}$ $$B = \frac{K_3}{K_2}$$

$$C = \frac{1}{K_2}$$

and $$D = K_1$$

Substitution of (4) into (1) yields the following:

(5)  $\qquad \frac{1}{K_2}(K_s + K_1 K_3) + I_2 = \left(\frac{K_3}{K_2} + \frac{1}{K_2} I_1\right)(K_1 + I_3)$ This equation demonstrates the interrelation between the constants of the apparatus of Fig. 3. Thus, the term A involves $K_1$, $K_2$, and $K_3$, the term B involves $K_2$, and $K_3$, and C and D involve the terms $K_2$ and $K_1$ respectively.

FIGURE 4

Figure 4:
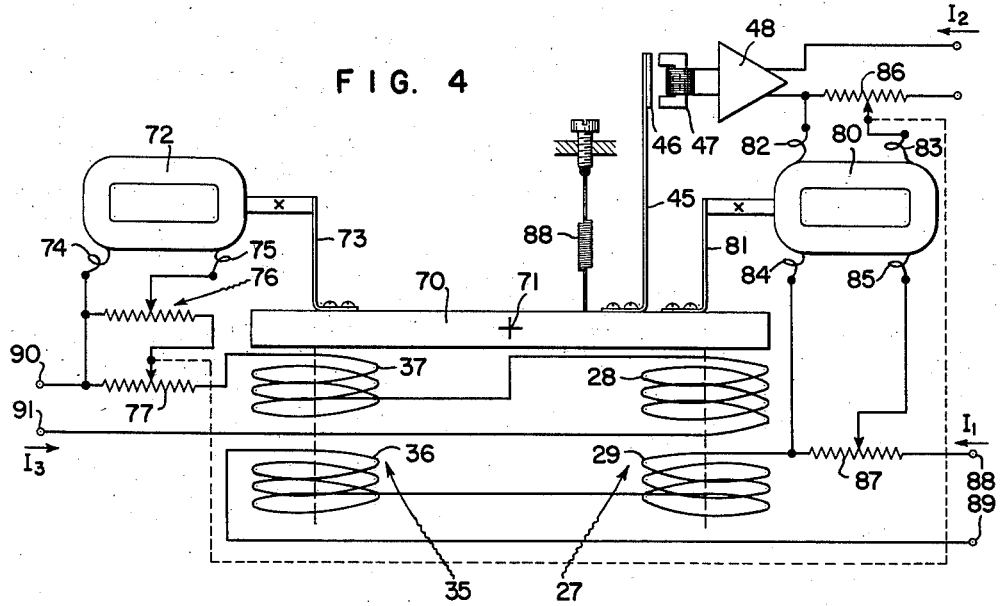
Fig. 4 shows a ratio relay apparatus incorporating two force balancing units which respond in accordance with the first power of the applied electrical signals.

The apparatus of Fig. 4 was devised as a modification of the apparatus of Fig. 3 in order to cut down the interrelationship between the constants of the apparatus. By minimizing this interrelationship, it is possible to more readily calibrate the apparatus.

As with Fig. 1, the apparatus of Fig. 4 operates upon the force balance principle. Here, a force balance member 70 is pivoted at 71. Force producing units 27 and 35 are provided to act on the opposite ends of the member 70 and correspond to the force producing units of Fig. 1. The coil sections corresponding to the coil sections of Fig. 1 carry corresponding reference numerals.

Also applying a force to the member 70 is a coil means 72 which is of the same type as the coil means 41 of the force producing unit 40 of Fig. 1. A link 73 connects the member 70 to the coil 72 so that the force created by the coils 72 may be transmitted to the member 70. The input terminals 74 and 75 are connected to a pair of potentiometer units 76 and 77 with a tap of the unit 77 being connected to one end of the resistor 76 and the tap of the unit 76 being connected to terminal 75.

A further device provided for producing a force upon the member 70 comprises a coil means 80 which is linked to the member 70 by a link 81. The coil means 80 is formed into two separate sections with one section having input terminals 82—83 and the other input section having input terminals 84—85. A potentiometer resistor 86 is connected to the coil input terminals 82—83 while a further potentiometer resistor 87 is connected to the input terminals 84—85.

A further force is produced upon the beam 70 by a spring member 88. The motion of the member 70 is detected by apparatus which corresponds to that of Fig. 1 and carries the same reference numerals.

In considering the operation of Fig. 4, the current input signal $I_1$ is applied to the input terminals 88 and 89. The current flows through the resistor 87 and coils 29 and 36 connected in series. Further, a portion of the current is divided by the potentiometer device 87 so that current will flow to the input terminals 85 and 84 of one half of the coil section of the coil means 80.

The current $I_2$ is the output current and is produced by the motion detection portion of the apparatus 45—48. This current flows through the potentiometric device 86 and a portion of the current is picked off and fed to the terminals 82—83 of the other half of the coil means 80.

A further input circuit is by way of input terminals 90 and 91 where the current signal $I_3$ is flowing. This current flow passes through the coils 28 and 37 connected in series as well as a potentiometric device 77. The current is divided in its flow by the slider of the potentiometric device 77 and part of the current will flow to the potentiometric device 76 where a further portion is picked off and fed to the coil means 72 at its input terminals 74—75.

The basic functioning of this apparatus is the same as that of the previous figures. In this figure, the input currents $I_1$ and $I_3$ produce resultant unbalance forces upon the member 70 so as to tend to cause the member to move. The motion of the member is detected by the motion detection mechanism 45—48 to produce an output current which will provide a force balancing current in the coil means 80 to balance the member 70.

The exact functioning of the apparatus shown in Fig. 4 may best be understood by an analysis of the balance equation of the device. The desired torque balance equation takes the same form as Equation 1 above. The actual balance equation for the device of Fig. 4 is as follows:

(6)  $\qquad K_s + K_2 I_2 = I_1 I_3 + K_2 K_3 I_3 + K_1 I_1$ where
$K_1$=Divider ratio of $R_{87}$ if $R_{84-85} \gg R_{87}$
$K_2$=Divider ratio of $R_{86}$ or $R_{76}$ if $R_{82-83} \gg R_{86}$ and $R_{74-75}$ and $R_{76} \gg R_{77}$
$K_3$=Divider ratio of $R_{76}$ if $R_{74-75} \gg R_{76}$ Comparing (6) with (3), leads to the following:

$$A - BD = \frac{K_s}{K_2}, \quad C = \frac{I}{K_2}$$

$$B = K_3 \text{ and } CD = \frac{K_1}{K_2}$$

Therefore:

(7)
$$A = \frac{K_s}{K_2} + K_1 K_3, \quad B = K_3$$

$$C = \frac{I}{K_2} \text{ and } D = K_1$$

Substitution of (7) into (1) yields the following:

(8) $\quad \frac{K_s}{K_2} + K_1 K_3 + I_2 = \left(K_s + \frac{I}{K_2} I_1\right)(K_1 + I_3)$ The assumptions applied to Equation 2 are likewise applicable here.

Equation 8 demonstrates that constants B, C, and D are functions of $K_3$, $K_2$ and $K_1$ only and are, therefore, not related. While constant A is a function of $K_s$, $K_2$, $K_1$, and $K_3$, it will be readily apparent that the constants $K_1$, $K_2$, and $K_3$ may be set for B, C, and D with the final setting for constant A being made by the adjustment of the spring 88. Thus, the apparatus of Fig. 4 is more readily adapted to simple calibration and adjustment.

FIGURE 5

Figure 5:
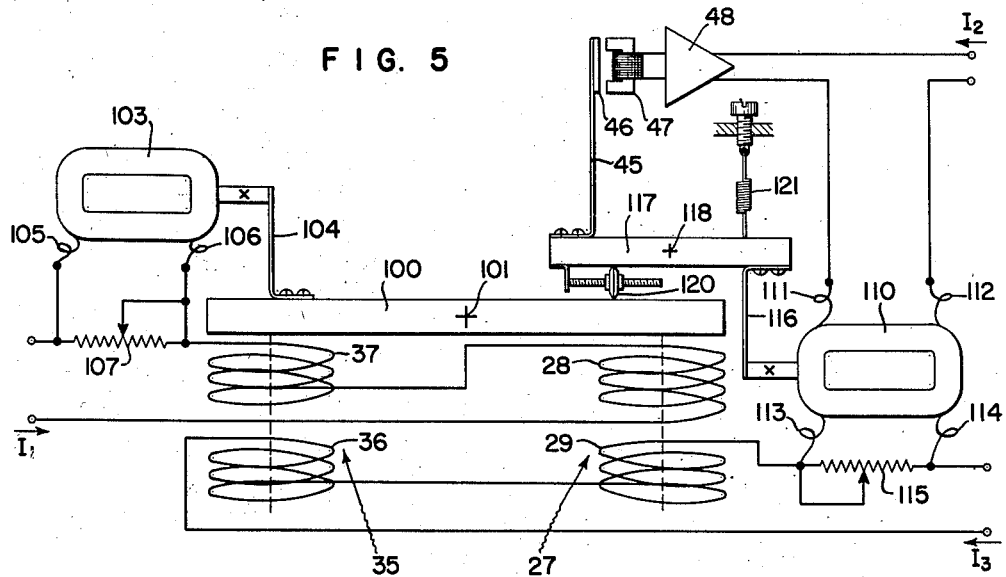
Fig. 5 shows a modified form of the apparatus shown in Fig. 4.

The apparatus of Fig. 5 is a modification of that of Fig. 4 with the present figure showing a device which has the advantage of the overall gain of the apparatus remaining constant regardless of the settings of the individual coefficient or constant controls. This is achieved by not shunting the force balancing coil section in the output circuit.

In this figure, the force balance member is represented by the numeral 100. This member 100 is pivoted at 101 and takes the general form of the force balance member shown in Figs. 1 through 4. The multiplying force producing means of Fig. 1 is incorporated in the present figure and carries corresponding reference characters. In addition there is provided a coil means 103 which is of the same general type as the force producing unit 40 of Fig. 1. The coil means 103 is connected by means of the link 104 to the member 100 to apply forces thereto proportional to the magnitude of the current flowing through input terminals 105—106 on the input of the coil means 103. A rheostat 107 is connected across the input leads 105—106.

A further force producing means for the force balance member 100 is the coil means 110. This coil means is divided into two sections with one section having input terminals at 111 and 112. Further input terminals for the other section of the coil means 110 are provided at 113—114. A rheostat 115 is connected across the input terminals 113—114. The coil means 110 acts through a link 116 to exert a force upon a beam 117 which is pivoted at 118. The pivoted beam 117 is coupled to the beam 100 by a lever ratio adjusting means 120. A spring 121 is provided to supply an additional biasing force to the beam 117.

The basic operation of Fig. 5 will be understood when it is noted that the input current $I_3$ flows through the coils 36 and 29 connected in series and through the rheostat 115 where a part of the current will divide and flow through one section of the coil means 110 by way of the input terminals 113—114. This current flow will produce a resultant force upon the member 100 by way of the force producing devices 27, 35, and coil means 110. The current flow $I_1$ which flows through coils 28, 37, and 103 produces a further force upon the member 100. Any unbalance force due to the currents $I_1$ and $I_3$ will be indicated by a tendency for the pivoted members 100 and 117 to move. The motion will be detected by the mechanism 45—48 which will produce an output current proportional to the unbalance force and this output current will pass through the other section of the coil means 110 by way of terminals 111—112 to produce a resultant balancing force upon the pivoted beam 109.

Analyzing the operation of Fig. 5 more specifically, it should first be noted that this apparatus has also been designed to satisfy the requirements of Equation 1 above. The actual balance equation of this apparatus is as follows:

(9)
$$K_s + I_2 = K_3 I_3 + K_2 l_1 I_2 + K_2 K_1 I_1$$

where $$K_1 = \frac{R_{107}}{R_{105-106} + R_{107}}$$

$K_2$=lever ratio from means 120

$$K_3 = \frac{R_{115}}{R_{113-114} + R_{115}}$$

Comparing (9) with (3) leads to the following:

$$A - BD = K_s, \quad CD = K_2 K_1$$
$$B = K_3, \text{ and } C = K_2$$

Therefore:

(10) $\quad A = K_s + K_3 K_1, \quad B = K_3$
$\quad\quad\quad C = K_2, \quad D = K_1$ Substitution of (10) into (1) yields the following:

(11) $\quad K_s + K_3 K_1 + I_2 = (K_3 + K_2 I_1)(K_1 + I_3)$

Equation 11 demonstrates that the coefficient A is the only one that is dependent upon coefficients associated with the other variables. As with Fig. 4, it will be readily apparent that this form of apparatus may be adjusted in the constants $K_1$, $K_2$ and $K_3$ with the final adjustment of the apparatus being made by means of the spring 121 which is acting only upon the coefficient or constant associated with $I_2$. Thus, this form of the apparatus is also readily adapted to simple calibration and adjustment.

FIGURE 6

This figure discloses a further modification of the apparatus of Fig. 4 with the advantages that this figure is also characterized by constant gain regardless of the setting of the individual coefficient controls. In this figure, there is a pivoted force balance member 125 which is pivoted at 126. The ends of the beam on member 125 are so arranged to have forces applied thereto by the force producing units 27 and 35. As these units correspond to those of Fig. 1, they carry corresponding reference characters.

Further means for producing a force upon the member 125 is provided in the coil means 127 which acts through a link 128 to apply a variable force to the member 125. A pair of input terminals 129—130 are connected to one end and the slider of a potentiometric device 131, the latter of which is connected to one end and the slider of a further potentiometric device 132. In series with the resistor of the potentiometric device 132 is a further resistor of a potentiometric device 133.

An additional force producing means for the member 125 is provided in the coil means 135 which is divided into two sections. One section of the coil means has its input at 136—137, said terminals 136—137 being in series with the output of the unbalance sensing means 45—48. A further pair of input terminals 138—139 are connected to the other section of the coil means 135. A potentiometric device 140 is connected by way of an end terminal and the slider across the input terminals 138—139 and this device 140 is in series with a further potentiometric device 141. The coil means 135 is connected by means of a link 143 directly to the force balance member 125. A coefficient adjusting spring 142 is also connected to the beam 125.

Figure 6:
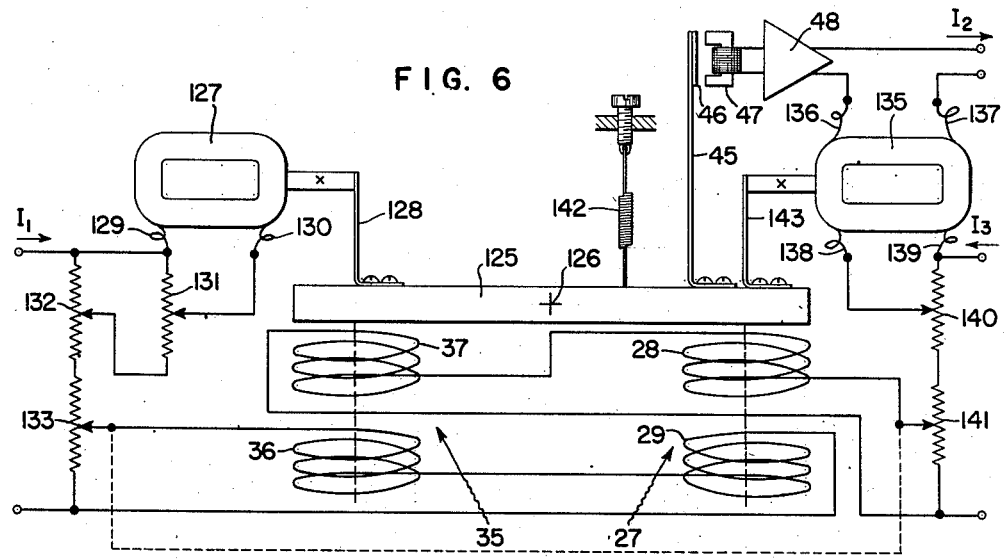
Fig. 6 shows a further modification of the apparatus of Fig. 4.

The basic operation of Fig. 6 will be noted by first considering the current flows through each of the coils of the force producing apparatus. The input signal $I_1$ will flow through the potentiometric devices 132 and 133 with a portion of the signal being passed by way of potentiometric device 131 to the input terminals 129 and 130 of coil means 127. A further portion of the current $I_1$ will be flowing from the potentiometric device 133 to the coils 36 and 29 connected in series.

The current $I_3$ flows through the potentiometric devices 140 and 141. The current divides from the device 140 and passes to the input terminals 138—139 of one section of the coil means 135. A further portion of the current $I_3$ will be flowing from the potentiometric device 141 through coils 28 and 37 connected in series.

The currents flowing through the force producing units 27 and 35 will produce a resultant force upon the force balance member 125 which is a product of the applied currents. A further force will be produced by a current flowing in the coil means 127 as well by the current flowing in one section of the coil means 135. If there is a resultant unbalance force upon the member 125, this will be detected by the unbalance sensing means 45—48. The output of the sensing means 45—48 will be a current $I_2$, which, when fed through the other section of the coil means 135 by way of terminals 136—137 will provide a force upon the member 125 which will balance the forces acting upon the member 125.

To consider more specifically the balance equation of the present apparatus with respect to equation (1) above, the following torque balance equation is presented;

(12) $$K_s + I_2 = K_3 I_3 + K_m I_1 I_3 + K_m K_1 I_1$$

where $K_1$ = voltage divider ratio of $R_{131}$ if $R_{129-130} \gg R_{131}$
$K_m$ = voltage divider ratio of $R_{133}$ and $R_{141}$
$K_3$ = voltage divider ratio of $R_{140}$ if $R_{138-139} \gg R_{140}$ Comparing (12) with (3) leads to the following:

$A - BD = K_s$, $B = K_3$
$C = K_m$, and $CD = K_m K_1$

Therefore:

(13) $A = K_s + K_1 K_3$
$B = K_3$
$C = K_m$, and
$D = K_1$

Substituting (13) into (1) yields the following:

(14) $$K_s + K_1 K_3 + I_2 = (K_3 + K_m I_1)(K_1 + I_3)$$

The Equation (14) demonstrates with respect to Fig. 6 that the constants associated with the coefficients B, C, and D, may first be adjusted prior to the adjustment of the constant A so that the final adjustment of the apparatus may be accomplished by the adjustment of the spring, which in this figure is spring 142. Thus, this form of the device is also readily adapted for easy calibration and adjustment.

FIGURE 7

Figure 7:
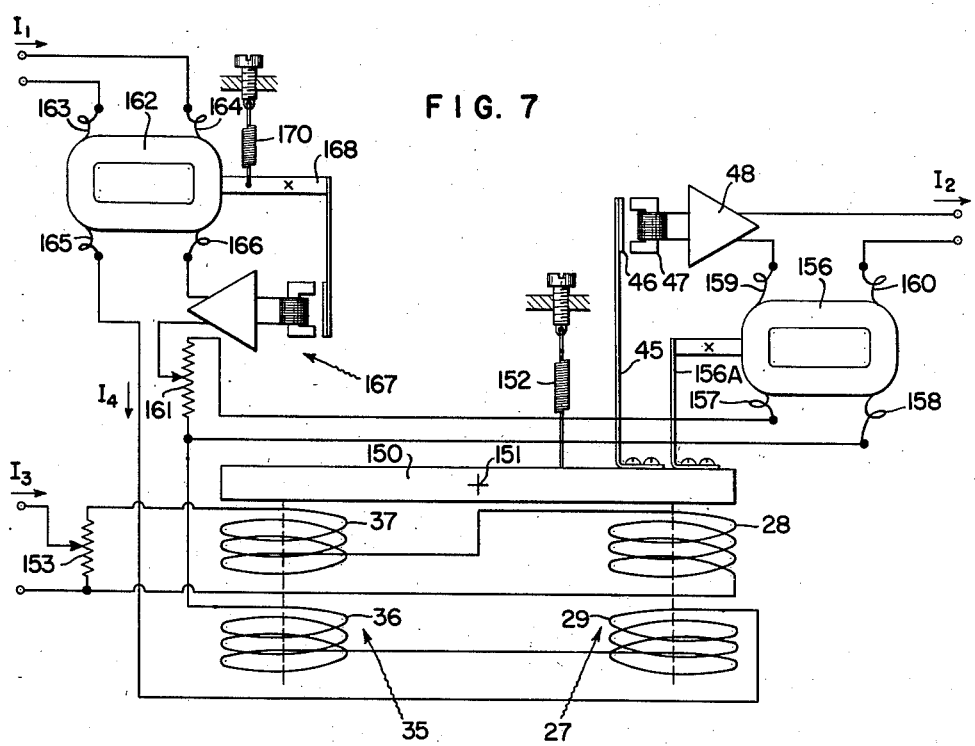
Fig. 7 shows a preferred form of ratio relay apparatus wherein the constants associated with the balance equation of the apparatus are all adjustable independently of each other.

The apparatus of Fig. 7 satisfies the requirements of Equation 1 above and provides an additional feature wherein each of the constants A, B, C and D, are independent of each other so that it is possible to adjust any one of the constants without affecting the adjustment of any of the other.

Structurally, the apparatus of Fig. 7 comprises a force balance member 150 which is pivoted at 151. Acting directly upon the member 150 are the force producing units 27 and 35 and these units correspond to the same numbered units in Fig. 1. Connected directly to the member 150 is a spring 152 which is used to apply a predetermined force thereto. A further means for producing a force upon the member 150 is provided by the coil means 156. The coil means 156 is divided into two sections with one section having its input at terminals 157—158. The other input section to the coil means 156 is by way of terminals 159—160. The signal for the coil means section having the input terminals 157—158 is derived from a potentiometric means 161. The current for the input terminals 159—160 is derived from the motion detecting mechanism 45—48.

A further coil means 162 is provided for modifying one of the input signals. This coil means 162 comprises two sections, one section having inputs at terminals 163—164 and the other section having inputs at 165—166. The coil means 162 comprises a force balance unit in itself and has a motion sensing means 167 which is connected to the output member 168 of the coil means 162. This sensing means 167 may correspond to the motion or unbalance sensing means 45—48. A spring 170 is connected to the member 168 to provide a suitable coefficient adjusting means.

The operation of Fig. 7 is basically the same as that of the foregoing devices of Figs. 4 through 6. That is, it is a force balance mechanism where the unbalance forces acting upon the pivoted member 150 are detected by a motion sensing means and an output current is produced which acts through appropriate force balancing means to force balance the pivoted member 150.

Considering the operation more specifically, it will be noted that the current signal $I_1$ flows into the coil means 162 by way of input terminals 163—164. This current will create a force tending to move the output member 168. This motion is detected by the sensing element 167 which produces an output current $I_4$. This current flows through the potentiometric resistor of the potentiometric device 161, through the coils 36 and 29 connected in series, as well as through the balancing section of the coil means 162 by way of terminals 165—166. A portion of the current flowing through the potentiometric device 161 is picked off by the tap thereof and fed to the coil means 156 at its input terminals 157—158. Thus, the current flow from the current $I_4$ will be creating a force upon the member 150 by way of the coils 36, 29, and the input section of coil means 156.

The current $I_3$ is connected directly to the coil means 28 and 37 in series by way of the potentiometric device 153. This current $I_3$ will operate with the current $I_4$ in the multiplying force producing units 27 and 35 so that the resultant force upon the member 150 will be the product of the applied current signals $I_3$ and $I_4$. Added to the force produced by the force units 27 and 35 will be the force from the coil means 156 with the current in the input section thereof producing a force which acts through the link 156A on the member 150.

If there is a resultant unbalance of the applied forces upon the member 150, this unbalance will be detected by the detecting means 45—48. The output current from the device 48 represented by the current signal $I_2$ will be applied by way of terminals 159—160 to the coil means 156. This current flow will produce a reaction force upon the link 156A to balance the forces acting upon the member 150.

The coefficients or constants associated with this form of the ratio relay are each independently adjustable with respect to the other. In other words, the spring members 152 and 170 as well as the potentiometric devices 153 and 161 may each be adjusted without affecting the coefficient adjustment accomplished by any of the others.

This relationship is most readily understood by consideration of the torque balance equations of this apparatus. The principal balance equation for this apparatus is as follows:

(15)
$$K_s + C_1 I_2 = C_2 K_1 I_4 + C_3 (K_m I_3 I_4)$$

where $$I_4 = C_4 (K_{s1} + I_1)$$

$K_s$ = spring constant of spring 152

$K_{s1}$ = spring constant of spring 170

$$K_m = \frac{KO}{R_{153} + R_{36-28}} \quad (O = \text{angle of rotation of potentiometer } R_{153})$$

$$K_1 = \frac{KO}{R_{161} + R_{157-158}}$$

$C_1$, $C_2$, $C_3$, and $C_4$ are system constants. If selected to be equal to 1, the following equation may be reduced to

(16)
$$K_s + I_2 = K_1(K_{s1} + I_1) + K_m I_3 (K_{s1} + I_1)$$

or

(17)
$$K_s + I_2 = (K_1 + K_m I_3)(K_{s1} + I_1)$$

The Equation 17 thus corresponds to Equation 1 where $A = K_s$, $B = K_1$, $C = K_m$ and $D = K_{s1}$. This comparison readily demonstrates the fact that each of the coefficients may be adjusted without affecting the magnitude of any of the others.

FIGURE 8

The apparatus of Fig. 8 shows the apparatus of Fig. 1 reconnected as a power measuring transducer. The components correspond to those of Fig. 1 and carry corresponding reference numerals. In this arrangement, the inputs are alternating current signals $I_1$ and $I_v$ representing a power line current and voltage. The input $I_i$ is connected to coils 37 and 28 in series while the input $I_v$ is connected to the coils 29 and 36 in series. The currents in the coils will produce a resultant force on the beam 25 which is proportional to the product of the applied input signals. The net input force on beam 25 is balanced by the linear force coil 41 which receives an output current from the beam motion detector 45—48.

The apparatus is particularly suited to this type of use in that the signals induced in the adjacent coils due to transformer action are cancelled out in the resultant forces on the beam. Thus, any A. C. induced in coil 28 due to the coil 29 will be cancelled out by the signal induced in coil 37 by the coil 36. Conversely, any signal induced in the coil 36 by coil 37 will be cancelled out by the signal induced in coil 29 by coil 28. Thus, the net input force on the beam 25 will be due solely to the multiplied function of the two input signals.

The current in the output circut load impedance 170 will be proportional to the power input signals, $I_i$ times $I_v$.

FIGURE 9

Fig. 9 is basically the same as Fig. 8 with the exception that the coils of the multiplying unit have been changed so that there is a single coil acting on either end of the pivoted beam 25. In this case, two separate input signals are flowing through each coil. The apparatus is shown to include coils 180 and 181 positioned to exert a force on the beam 25. The input signals are derived from power lines 182—183 by a current transformer 184 and a potential transformer 185. The current transformer 184 feeds a further transformer 186. The secondary of the transformer 186 is connected between the coils 180 and 181 and the center tap of the secondary of transformer 185.

In operation, the input signal from the potential transformer will flow through a series circuit formed by the coils 180 and 181 which are connected in series. The input signal from the transformer 186 flows through two parallel paths formed by the coils 180 and 181. In one of the coils, the current signals from the inputs will add while in the other coil, the current signals will subtract. The net effect on the beam 25 is a force which is proportional to the product of the two input signals. This force will be balanced by the linear force coil 41 which receives its energizing current from the beam motion detector 45—48. The current signal in the output impedance 170 will be a direct current signal proportional to the power in the lines 182—183.

Summary

From the foregoing it will be readily apparent that there has been provided a new and improved electrical ratio relay apparatus which is very flexible and adaptable to ratio measuring problems. Further, the apparatus has been shown in forms where the gain of the relay apparatus is not affected by adjustment of the coefficient selecting means. Further, there has also been provided a version of the apparatus wherein all of the coefficient adjusting means are arranged so that they may be adjusted independently of each other which feature further enhances the adaptability of the apparatus to numerous types of ratio measuring problems.

While, in accordance with the provisions of the statutes, there have been illustrated and described the best forms of the embodiments of the invention known, it will be apparent to those skilled in the art that changes may be made in the forms of the apparatus disclosed without departing from the spirit of the invention as set forth in the appended claims, and that in some cases certain features of the invention may be used to advantage without a corresponding use of other features.

Having now described the invention, what is claimed as new and for which it is desired to secure Letters Patent is:

1. Electro-mechanical apparatus comprising a member to be force balanced, a first electro-magnetic device having two electrical inputs and being positioned to exert a first force on said member in accordance with the product of the electrical signals on said two electrical inputs, said first electro-magnetic device comprising a pair of coil means, one of which has a force output proportional to the square of the sum of the applied signals on said electrical inputs and the other of which has a force output proportional to the square of the difference of the applied signals on said electrical inputs, and a second electro-magnetic device having an electrical input connected to said member to exert a force on said member in opposition to the force created by said first electromagnetic device.

2. Electro-mechanical apparatus comprising a movable member to be force balanced, a first electro-magnetic device having two electrical inputs, said first device including a pair of force producing elements positioned relative to said movable member to exert a resultant force on said member proportional to the product of the signals on said two electrical inputs, a second electromagnetic device connected to said movable member to exert a force on said member in opposition to said first device, said second device having an electrical input, motion sensing means producing an electrical signal variation on its output, and means connecting said output to one of said electrical inputs.

3. Electrical apparatus comprising a mechanical balance, a first force producing means positioned to produce a resultant force on said balance which is proportional to the product of two electrical input signals, said means comprising a first pair of coil means positioned to produce a first force on said balance which varies as the square of the sum of the currents flowing in said coils and a second pair of coil means positioned to produce a second force on said balance in opposition to said first force which varies as the square of the difference of the currents flowing in said coils, and a second force producing means connected to said balance to exert a force opposing said resultant force, said last named force producing means comprising a movable coil means having a force output which varies as a first power of the net ampere turns of said coil means.

4. Electrical apparatus comprising a mechanical balance, a first force producing means positioned to produce a resultant force on said balance which is proportional to the product of two electrical input signals, said means comprising a first pair of coil means positioned to produce a first force on said balance which varies as the square of the sum of the currents flowing in said coils and a second pair of coil means positioned to produce a second force on said balance in opposition to said first force which varies as the square of the difference of the currents flowing in said coils, unbalance detecting means connected to said balance, said detecting means having an output current proportional to the magnitude of the unbalance forces acting on said balance, a second force producing means connected to said balance to exert a force to oppose said resultant force, said last means comprising a movable coil means having a force output which varies as a first power of the net ampere turns of said coil means, and circuit means connecting the output of said detecting means to one of said coil means.

5. Apparatus as defined in claim 4 wherein the output of said detecting means is connected to said coil means of said second force producing means.

6. Apparatus as defined in claim 4 wherein the output of said detecting means is connected to one each of said first and second pair of coil means.

7. In an electrical ratioing apparatus, the combination comprising, a movable member, a first electro-magnetic means having a pair of electrical input circuits, said first electro-magnetic means including a pair of force producing elements coupled to produce a resultant output force on said movable member proportional to the product of the electrical signals applied to said pair of input circuits, a second electro-magnetic means connected to said member, said second electro-magnetic means comprising electrical coil means having an input circuit and producing an opposing force on said movable member which force varies as a first power of the net ampere turns of said coil means, a member motion detector connected to said member and producing an electrical output signal proportional to the unbalance forces on said member, and circuit means connecting said output to one of said input circuits.

8. In an electrical ratioing apparatus, the combination comprising a movable member, a first electro-magnetic means having a pair of electrical input circuits, said first electro-magnetic means including a pair of force producing elements coupled to produce a resultant output force on said movable member proportional to the product of the electrical signals applied to said pair of input circuits, a second electro-magnetic means connected to said member, said second electro-magnetic means comprising electrical coil means having an input circuit and producing an opposing force on said movable member which force varies as a first power of the net ampere turns of said coil means, a member motion detector connected to said member and producing an electrical output signal proportional to the unbalance forces on said member, and circuit means connecting said output signal to one of said first named pair of inputs.

9. In an electrical ratioing apparatus, the combination comprising a movable member, a first electro-magnetic means having a pair of electrical input circuits, said first electro-magnetic means including a pair of force producing elements coupled to produce a resultant output force on said movable member proportional to the product of the electrical signals applied to said pair of input circuits, a second electro-magnetic means connected to said member, said second electro-magnetic means comprising electrical coil means having an input circuit and producing an opposing force on said movable member which force varies as a first power of the net ampere turns of said coil means, a member motion detector connected to said member and producing an electrical output signal proportional to the unbalance forces on said member, and circuit means connecting said output to said coil means.

10. In an electrical ratioing apparatus, the combination comprising, a movable member, a first electro-magnetic means having a pair of electrical input circuits, said first electro-magnetic means producing an output force on said movable member proportional to the product of the electrical signals applied to said pair of input circuits, a second electro-magnetic means connected to said member, said second electro-magnetic means comprising electrical coil means having an input circuit and producing an opposing force on said movable member which force varies as a first power of the net ampere turns of said coil means, a member motion detector connected to said member and producing an electrical output signal proportional to the unbalance forces on said member, circuit means connecting said output to said coil means, and further circuit means connecting a portion of said coil means in circuit with at least one of said pair of input circuits.

11. In an electrical ratioing apparatus, the combination comprising, a movable member, a first electro-magnetic means having a pair of electrical input circuits, said first electro-magnetic means producing an output force on said movable member proportional to the product of the electrical signals applied to said pair of input circuits, a second electro-magnetic means connected to said member, said second electro-magnetic means comprising electrical coil means having an input circuit and producing an opposing force on said movable member which force varies as a first power of the net ampere turns of said coil means, a member motion detector connected to said member and producing an electrical output signal proportional to the unbalance forces on said member, circuit means connecting said output to said coil means, and a third electro-magnetic means connected to said member, said third electro-magnetic means comprising a coil means which produces a force on said member which varies as the first power of the net ampere turns applied to said coil means.

12. In an electrical ratioing apparatus, the combination comprising, a movable member, a first electro-magnetic means having a pair of electrical input circuits, said first electro-magnetic means producing an output force on said movable member proportional to the product of the electrical signals applied to said pair of input circuits, a second electro-magnetic means connected to said member, said second electro-magnetic means comprising electrical coil means having an input circuit and producing an opposing force on said movable member which force varies as a first power of the net ampere turns of said coil means, a member motion detector connected to said member and producing an electrical output signal proportional to the unbalance forces on said member, circuit means connecting said output to said coil means, a third electro-magnetic means connected to said member, said third electro-magnetic means comprising a coil means which produces a force on said member which varies as the first power of the net ampere turns applied to said coil means, and means connecting the coil means of said third electro-magnetic means in circuit with one of said pair of inputs of said first electro-magnetic means.

13. In an electrical ratioing apparatus, the combination comprising a movable member, a first electro-magnetic means having a pair of electrical input circuits, said first electro-magnetic means producing an output force on said movable member proportional to the product of the electrical signals applied to said pair of input circuits, a second electro-magnetic means connected to said member, said second electro-magnetic means comprising electrical coil means having an input circuit and producing an opposing force on said movable member which force varies as a first power of the net ampere turns of said coil means, a member motion detector connected to said member and producing an electrical output signal proportional to the unbalance forces on said member, circuit means connecting said output to said coil means, a third electro-magnetic means having an electrical input and an electrical output, said output of said third electro-magnetic means being connected to said coil means and to one of said inputs of said first electro-magnetic means.

14. Apparatus as defined in claim 13 wherein said movable member has a first resilient means connected to apply a force thereto and said third electro-magnetic means has a second resilient means connected to apply a force thereto, said resilient means each providing independent adjustments for the constants of said apparatus.

15. In combination, a magnetic core structure comprising first and second magnetic elements each forming a loop with a lateral air gap extending along the face thereof, an elongated pivoted member extending into the air gap of said first and second elements and arranged for movement across the air gap, first coil means mounted on said first magnetic element to produce a force on one end of said member proportional to the square of the difference of two applied electrical signals, and second coil means mounted on said second magnetic element to produce a force on the other end of said element proportional to the square of the sum of two applied electrical signals.

16. Apparatus as defined in claim 15 wherein a force balancing electro-magnetic means is connected to said element, said last named means producing a force on said element which varies linearly with an applied electrical signal.

17. In an electrical signal ratio producing apparatus, the combination comprising a force balanced member, first electro-magnetic means having a pair of electrical input circuits, said first electro-magnetic means being positioned with respect to said member to create a force on said member which is proportional to the product of the input electrical signals, a second electro-magnetic means connected to said member to produce a force which varies linearly with an applied electrical signal, first potentiometric means connecting one of the electrical inputs to said first electro-magnetic means to supply the input to said second electro-magnetic means, a third electro-magnetic means connected to said member to produce a force which varies linearly with an applied electrical signal, a second potentiometric means coupling the input of said third electro-magnetic means to the other input of said first electro-magnetic means, a member motion sensing means, said sensing means producing an output signal proportional to the motion of said member, and a third potentiometric means connecting the output of said sensing means to a further input of said third electro-magnetic means so that said third electro-magnetic means will supply a balancing force to said member.

18. Apparatus as defined in claim 17 wherein an adjustable resilient means is connected to said member to supply a calibrating force thereto.

19. Apparatus as defined in claim 17 wherein said third electro-magnetic means is connected to said member through a lever mechanism whose effective lever arms are adjustable to provide for calibrating said apparatus.

20. Electro-mechanical apparatus comprising a member to be force balanced, and an electro-magnetic device having two electrical inputs and being positioned to exert a first force on said member in accordance with the product of the electrical signals on said two electrical inputs, said electro-magnetic device comprising a pair of coil means, one of which has a force output proportional to the square of the sum of the applied signals on said electrical inputs and the other of which has a force output proportional to the square of the difference of the applied input signals.

21. An electro-magnetic force producing apparatus comprising a movable member, a first pair of coils fixed in position relative to said movable member and being adapted for electrical energization to form a first magnetic attractive unit acting in a first direction on said movable member, a second pair of coils fixed in position relative to said movable member and being adapted for electrical energization to form a second magnetic attractive unit acting on said movable member in a direction opposing said first direction, a first input circuit connecting one of the coils of each pair in series, and a second input circuit connecting the other coil of each pair in series so that the net force of said first and second magnetic units will be proportional to the product of the signals on said two input circuits.

22. An electrical apparatus comprising a magnetic core means having an air gap, a magnetic member positioned for movement in said air gap, first coil means mounted on said magnetic core means to produce a first force on said magnetic member proportional to the square of the sum of two applied input signals, and a second coil means mounted on said magnetic core means to produce a second force on said magnetic member in opposition to said first force and proportional to the square of the difference of said two applied input signals so that the net force on said movable member is proportional to the product of said two applied input signals.

23. An electrical apparatus comprising a movable magnetic member, a pair of electrical magnetic force producing units positioned to exert a moving force on said movable member, said force producing units having two input circuits and an output force on said member which is a function of the product of the signal on said input circuits, a linear force producing electro-magnetic means positioned on said member, said linear force producing means comprising an electrical coil having three input circuits, two of which are common to said first named input circuits and one of which is a feedback circuit, and a member position sensing means connected to said member to produce an output signal proportional to the motion of said member, said position sensing means being connected to supply a balancing signal to said feedback circuit.

References Cited in the file of this patent

UNITED STATES PATENTS

| | | |
|---|---|---|
| 1,578,831 | Keeler | Mar. 30, 1926 |
| 2,686,635 | Markson | Aug. 17, 1954 |

OTHER REFERENCES

Dorsey, S. E.: "An electro-mechanical multiplier for analog computer application," Proceedings of Electronic Computer Symposium, April 30, May 1, 2, 1952, in Los Angeles (the IRE Group on Electronic Computers with U. C. L. A.), preface date November 1952, pages V–1 through V–7.